March 10, 1959            J. KALFF            2,876,800

DEVICE FOR DELIVERING SMALL AMOUNTS OF LIQUID

Filed Dec. 14, 1954

INVENTOR
Jan KALFF
BY A J Michel
AGENT

United States Patent Office 2,876,800
Patented Mar. 10, 1959

2,876,800

DEVICE FOR DELIVERING SMALL AMOUNTS OF LIQUID

Jan Kalff, Nimeguen, Netherlands, assignor to Naamlooze Vennootschap Kunstzijdespinnerij' Nyma, Nimeguen, Netherlands, a limited-liability company of the Netherlands Application December 14, 1954, Serial No. 475,096

2 Claims. (Cl. 138—40)

The present invention relates to a device for continuously delivering small amounts of liquid. The object of the invention is to provide a device with the aid of which small amounts of liquid can be delivered continuously or intermittently.

It is known to deliver continuously small amounts of liquids from a bottle through a tube to a capillary tube which is connected to said tube by a piece of hose. It is obtained by matching in a suitable way the length of the capillary tube, the diameter of the capillary passage and the level of the liquid in the bottle, so that the liquid to be delivered in small amounts flows from the capillary tube with the desired small velocity. The known device, however, has the important disadvantage that one single particle of dirt in the liquid is able to clog the capillary tube. For that reason the device is not reliable. This way of delivering therefore cannot be accepted for industrial applications.

In order to remove this disadvantage the device according to the invention comprises two or more substantially parallelly arranged members, the mutual distance between which is capillarily small.

The principle of the invention will be clarified in the following explanation.

(I) According to Poiseuille's Law, the rate of flow V (in units of volume per unit of time) of liquid through a capillary tube having a radius $r$ and length $l$ is given by the formula $$V = \frac{\pi P}{8\eta l} \cdot r^4$$

wherein $\eta$ is the viscosity of liquid and P is the pressure difference between the two ends of capillary tube.

(II) It is also known from the theory of viscous flow that, where the liquid flows between two parallel plates of infinite width, of a length $l$, and separated by a distance $a$, the rate of liquid flow V per unit of width becomes $$V = \frac{\pi P a^3}{12 \eta l}$$

(III) Where the liquid flows between two concentric cylinders, both of a length $l$, the larger cylinder having an inner radius $r_1$ and the smaller cylinder having an outer radius $r_2$, the formula is $$V = \frac{\pi P}{8\eta l} \left\{ r_1^4 - r_2^4 - \frac{(r_1^2 - r_2^2)^2}{\log nr_1 - \log nr_2} \right\}$$

If the distance $r_1-r_2$ between the two cylinders is relatively small, and $r_2$ is not too small (i. e. large relative to distance $r_1-r_2$), Case III becomes similar to Case II. By substituting $a=r_1-r_2$ in the Formula II, the total rate of flow $V_t$ per unit of time between the cylinders is given by formula $$V_t = \frac{P a^3}{12 \eta l} \cdot 2\pi r_1 = \frac{\pi P}{6\eta l} \cdot a^3 r_1$$

wherein $2\pi r_1$ is the outer circumference of annular opening between the two cylinders.

If a capillary tube with radius $r$ (the total cross-sectional area of opening therein equaling $r^2\pi$) is replaced by a pair of parallel plates defining therebetween a square area of a length $10r\pi$ and width $a=0.1r$ (thus equal in area to that of circular opening in the capillary tube with radius $r$), or by a pair of concentric cylinders the larger one of which has an inner radius $r_1=5r$ and with a distance $a=0.1r$ therebetween (thus again defining therebetween an annular area approximately equal to that within the capillary tube or between two parallel plates), and if the lengths of capillary tube, of the parallel plates and of concentric cylinders are equal, the total rate of liquid flow through the capillary tube, in accordance with Case I equals $$V_{1t} = \frac{\pi P r^4}{\eta l} \cdot \frac{1}{8} \text{ (Poiseuille's Law)}$$

the total rate of liquid flow between the parallel plates, in accordance with Case II above equals $$V_{IIt} = \frac{P}{\eta l} \cdot \frac{0.001 r^3}{12} \cdot 10 r\pi = \frac{\pi P r^4}{\eta l} \cdot \frac{1}{1200}$$

and the total rate of flow between the concentric cylinders, in accordance with Case III above equals $$V_{IIIt} = \frac{\pi P}{\eta l} \cdot \frac{0.001 r^3}{6} \cdot 5r = \frac{\pi P r^4}{\eta l} \cdot \frac{1}{1200}$$

Thus, the amount of liquid delivered by a circular capillary tube is 150 times greater than the amount delivered either by a flattened tube (i. e., two parallel plates) or two concentric cylinders even though the areas for passage of liquid are equal in all three cases. It follows that 150 capillaries according to preceding Cases II and III are equivalents of one circular capillary. Obviously, the clogging of one out of 150 capillaries has little effect on total liquid delivery. In practice, instead of 150 separate capillaries only one unitary capillary device, such as shown in the drawing, is made. Local clogging will have little effect upon total liquid delivery in such structures.

Although in principle a device comprising two parallel plates between which the liquid to be metered flows, can be used for continuously delivering and metering small amounts of liquid without the evil of clogging, generally the length of such a device will produce difficulties. Therefore a device is preferred which comprises a closed cylinder around which subsequently a number of hollow tubes are fixed, thus substantially increasing the cross-section available for flow and substantially reducing the length of the device. Nearly always it is desirable to direct the liquid which has been delivered to a certain point and therefore preferably an embodiment is selected in which the closed cylinder is longer than the hollow tube mounted around the closed cylinder, the length of each subsequent hollow tube decreasing.

In the drawing embodiments are shown of the device according to the invention which are preferred by way of example.

Figure 1:
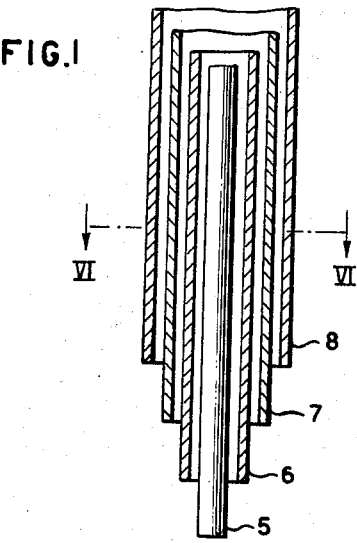
Fig. 1 shows a longitudinal section of an embodiment.
Figure 2:
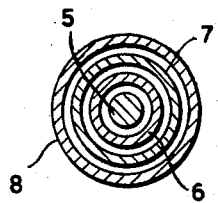
Fig. 2 shows a cross section of an embodiment according to Fig. 1 along the line VI—VI in Fig. 1.

The embodiment shown in Fig. 1 moreover has the advantage that the device easily can be taken apart. This is important for cleaning purposes of the device. The device according to the invention can be manufactured from any suitable material.

*Example*

During delivering mineral oil with a device according to Fig. 1, comprising a closed cylinder 5 (diameter 1.5 mm.) and three hollow tubes 6, 7, 8 (external diameter outer tube 5 mm., space between tubes always about 0.1 mm.) made of non-corrosive steel, the pressure of the liquid being maintained constant during seven days no change in liquid delivery per time unit could be observed. A capillary tube maintained under the same pressure and having the same delivery per time unit using the same mineral oil was completely clogged after one day.

Figure 3:
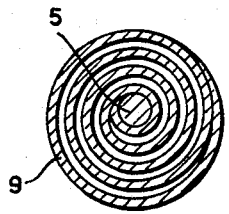
Fig. 3 shows a cross section of a different embodiment.

A device as shown in Fig. 3 is obtained by winding up a rectilinear or trapeze-shaped plate in which the liquid to be delivered flows through the spirally shaped slit belongs to the same invention.

The closed tube is indicated with 5 and the spirally wound plate with 9. If the plate is trapeze-shaped the shape of the device substantially will correspond with the form which is indicated in section in Fig. 1, the closed cylinder projecting at the bottom side.

What is claimed is:

1. A device for continuously delivering small amounts of liquid consisting of a closed cylinder and a plurality of hollow tubes coaxially surrounding said closed cylinder, the distance between said tubes and between said cylinder and the adjacent one of said tubes being capillarily small, said device having an inlet end and an exit end for the liquid passing therethrough, said cylinder extending beyond the adjacent one of said tubes at said exit end, and the successive outwardly adjacent tubes being of progressively shorter length at said exit end.

2. A device for continuously delivering small amounts of liquid consisting of a closed cylinder and a sheet wound around said cylinder in such manner that the convolutions of said sheet define therebetween a slot of spirallic cross-section, the distance between adjacent convolutions of said sheet being capillarily small.

References Cited in the file of this patent

UNITED STATES PATENTS

| | | |
|---|---|---|
| 2,100,504 | Crosley et al. | Nov. 30, 1937 |
| 2,210,480 | Brice | Aug. 6, 1940 |
| 2,508,224 | Carter | May 16, 1950 |

FOREIGN PATENTS

| | | |
|---|---|---|
| 741,890 | Germany | Oct. 7, 1943 |